US007756739B2

(12) United States Patent
D'hers et al.

(10) Patent No.: US 7,756,739 B2
(45) Date of Patent: Jul. 13, 2010

(54) SYSTEM AND METHOD FOR AGGREGATING A MEASURE OVER A NON-ADDITIVE ACCOUNT DIMENSION

(75) Inventors: Thierry D'hers, Redmond, WA (US); Thomas Conlon, Redmond, WA (US); Mosha Pasumansky, Redmond, WA (US); Irina Gorbach, Bellevue, WA (US); Alexander Berger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1389 days.

(21) Appl. No.: 10/777,918

(22) Filed: Feb. 12, 2004

(65) Prior Publication Data

US 2005/0182703 A1 Aug. 18, 2005

(51) Int. Cl.
*G06F 17/30* (2006.01)
(52) U.S. Cl. ...................................... 705/10
(58) Field of Classification Search .............. 705/10
See application file for complete search history.

(56) References Cited

U.S. PATENT DOCUMENTS

| | | | | |
|---|---|---|---|---|
| 6,161,103 | A * | 12/2000 | Rauer et al. | 707/4 |
| 6,282,544 | B1 * | 8/2001 | Tse et al. | 707/101 |
| 6,385,604 | B1 * | 5/2002 | Bakalash et al. | 707/3 |
| 6,662,174 | B2 * | 12/2003 | Shah et al. | 707/2 |
| 6,732,115 | B2 * | 5/2004 | Shah et al. | 707/102 |
| 7,031,953 | B2 * | 4/2006 | Shah et al. | 707/2 |
| 7,058,640 | B2 * | 6/2006 | Le | 707/100 |
| 7,139,766 | B2 * | 11/2006 | Thomson et al. | 707/101 |
| 7,315,849 | B2 * | 1/2008 | Bakalash et al. | 707/2 |
| 2002/0035565 | A1 * | 3/2002 | Shah et al. | 707/100 |
| 2002/0038229 | A1 * | 3/2002 | Shah et al. | 705/7 |
| 2002/0038297 | A1 * | 3/2002 | Shah et al. | 707/1 |
| 2002/0059267 | A1 * | 5/2002 | Shah et al. | 707/100 |
| 2002/0099692 | A1 * | 7/2002 | Shah et al. | 707/2 |
| 2004/0139061 | A1 * | 7/2004 | Colossi et al. | 707/3 |

OTHER PUBLICATIONS

Pedersen, Torben Bach et al., Multidimensional Database Technology IEEE Computer 2001, pp. 40-46.*
Kimball, Ralph et al., Expert Methods for Designing, Developing and Deploying Data Warehouses Wiley & Sons, 1998, ISBN: 0-471-25547-5.*
Microsoft OLE DB for OLAP—Programmer's Reference Microsoft, Dec. 1998.*
Oracle 8i—Application Developer's Guide—Fundamentals Release 8.15 Oracle, Feb. 1999, Part No. A680003-01.*
Gray, Jim et al., Data Cube: A Relational Aggregation Operator Generalizing Group-By, Cross-Tab, and Sub-Totals Data Mining and Knowledge Discovery, 1997.*

(Continued)

*Primary Examiner*—Scott L Jarrett
(74) *Attorney, Agent, or Firm*—Woodcock Washburn LLP

(57) ABSTRACT

A simple interface may be provided that enables the user to define parameters for aggregation of a semi-additive measure. The interface may enable the user to designate a measure as a semi-additive measure and to pair the measure with an additive aggregation function. The interface may also enable the user to select non-additive dimensions and to pair each non-additive dimension with a corresponding aggregation function. One such aggregation function is a by account aggregation function, which enables each account in an account dimension to be aggregated across a corresponding non-additive dimension according to an associated account type.

21 Claims, 12 Drawing Sheets

OTHER PUBLICATIONS

Chatziantoniou, Damianos, Optimization of Complex Aggregate Queries in Relational Databases Columbia University, 1997, UMI No. 9809696.*

Colliat, George, OLAP, Relational, and Multidimensional Database Systems SIGMOD Record, vol. 25, No. 3, Sep. 1996.*

Zaman, Kazi Atif-Uz, Computing and Querying Datacubes Columbia University, 2001, UMI No. 9998233.*

Best Bractices for Business Intelligence Using Microsoft Data Warehousing Framework Microsoft Corporation, Jul. 2002.*

Boon, Sean, Integrating Analysis Services with Reporting Services Microsoft, Jun. 2004.*

Kimball, Ralph et al., The Data Warehouse Toolkit: The Complete Guide to Dimensional Modeling—Second Edition Wiley Computer Publishing, 2002 ISBN 0-471-20024-7.*

Netz, Amir, OLAP Services: Semiadditive Measures and Inventory Snapshots Microsoft Corporation MSDN, Apr. 1, 1999.*

Trujillo, Juan et al., Applying UML and XML for Designing and Interchanging Information for Data Warehouses and OLAP Applications, IDEA Group, 2004.*

Whitehorn, Mark et al., Fast Track to MDX Springer, 2002, Chapter - 7.*

Dash, A.K. et al., "Dimensional Modeling for a Data Warehouse", *Software Engineering Notes*, Nov. 2001, 26(6), 83-84.

Espil, M.M. et al., "Efficient Intensional Redefinition of Aggregation Hierarchies in Multidimensional Dayabases", *DOLAP*, Nov. 9, 2001, 8 pages.

Harinarayan, V. et al., "Implementing Data Cubes Efficiently", *SIGMOD*, 1996, 205-216.

Hurtado, C.A. et al., "Updating OLAP Dimensions", *DOLAP*, 1999, 60-66.

Niemi, T. et al., "Constructing OLAP Cubes Based on Queries", *DOLAP*, Nov. 9, 2001, 9-15.

Pourabbas, E. et al., "Characterization of Hierarchies and Some Operators in OLAP Environment", *DOLAP*, 1999, 54-59.

Kimball, Ralph; Features for Query Tools; Data Warehouse Architect; Feb. 1997, 4 pages.

Netz, Amir; OLAP Services: Semiadditive Measures and Inventory Snapshots; Microsoft Corporation, Apr. 1, 1999, 7 pages.

Whitehorn, M. et al., "Snapshot Data Analysis," Chapter 7, Fast Track to MDX, Birkhäuser, 2006, pp. 99-109.

"Define Semiadditive Behavior (Business Intelligence Wizard)," SQL Server 2005 Books Online, Nov. 2008, 2 pages.

"Defining Semiadditive Behavior," SQL Server 2005 Books Online, Nov. 2008, 2 pages.

Whitehorn et al., "Fast Track to MDX", Springer-Verlag New York, LLC, Jan. 2002, 266 pages.

\* cited by examiner

Fig. 3

| INCOME 300 | | | |
|---|---|---|---|
| Account 302a | Month 302b | Location 302c | Value ("$") 302d |
| A | Jan | San Francisco | 2 |
| A | Jan | Los Angeles | 3 |
| A | Jan | San Diego | 1 |
| A | Feb | San Francisco | 4 |
| A | Feb | Los Angeles | 5 |
| A | Feb | San Diego | 2 |
| A | March | San Francisco | 6 |
| A | March | Los Angeles | 7 |
| A | March | San Diego | 3 |

Fig. 4

| BALANCES 400 | | | |
|---|---|---|---|
| Account 402a | Month 402b | Location 402c | Value ("$") 402d |
| B | Jan | San Francisco | 3 |
| B | Jan | Los Angeles | 9 |
| B | Jan | San Diego | 6 |
| B | Feb | San Francisco | 7 |
| B | Feb | Los Angeles | 3 |
| B | Feb | San Diego | 9 |
| B | March | San Francisco | 1 |
| B | March | Los Angeles | 2 |
| B | March | San Diego | 2 |

Fig. 6

|  | | Jan | Feb | March | Month 504b |
|---|---|---|---|---|---|
| Location 502c / California | San Diego | 1/6 | 2/9 | 3/2 | |
| | Los Angeles | 3/9 | 5/3 | 7/2 | |
| | San Francisco | 2/3 | 4/7 | 6/1 | |

State 506c / City 504c

| First | Quarter 506b |
|---|---|

Time 502b

```
┌─────────────────────────────────────────────────────┐
│                    Interface 900                     │
│  ┌───────────────────────────────────────────────┐  │
│  │                                               │  │
│  │   Additive                                    │  │
│  │ Aggregation    │ SUM                   905 │  │  │
│  │   Function                                    │  │
│  │                                               │  │
│  │                                               │  │
│  │  Time 502b   │ Drop Down Menu 910a      ▽ │  │  │
│  │                Additive                       │  │
│  │                Null                           │  │
│  │                Average of Children            │  │
│  │                First Child                    │  │
│  │                Last Child                     │  │
│  │                First Non-Empty Child          │  │
│  │                Last Non-Empty Child           │  │
│  │                By Account                     │  │
│  │                Sum                            │  │
│  │                Min                            │  │
│  │                Max                            │  │
│  │                Count                          │  │
│  │                                               │  │
│  │ Location 502c │ Drop Down Menu 910b     ▽ │  │  │
│  │                 Additive                      │  │
│  │                 Null                          │  │
│  │                 Average of Children           │  │
│  │                 First Child                   │  │
│  │                 Last Child                    │  │
│  │                 First Non-Empty Child         │  │
│  │                 Last Non-Empty Child          │  │
│  │                 By Account                    │  │
│  │                 Sum                           │  │
│  │                 Min                           │  │
│  │                 Max                           │  │
│  │                 Count                         │  │
│  │                                               │  │
│  └───────────────────────────────────────────────┘  │
└─────────────────────────────────────────────────────┘
```

Fig. 11

| Location 502c | | | | | |
|---|---|---|---|---|---|
| | | State 506c | | | |
| | | City 504c | | | |
| | California | San Diego | | | |
| | | Los Angeles | 6 / 18 | 11 / 19 | 16 / 5 |
| | | San Francisco | | | |

| | Jan | Feb | March | Month 504b |
|---|---|---|---|---|
| | First | | | Quarter 506b |
| | Time 502b | | | |

|  | | San Diego | 6 / 2 | | | |
|---|---|---|---|---|---|---|
| Location 502c | California | Los Angeles | 15 / 2 | | | |
| | | San Francisco | 12 / 1 | | | |
| | | | Jan | Feb | March | Month 504b |
| | | | First | | | Quarter 506b |
| | | | Time 502b | | | |

State 506c / City 504c

1200

SYSTEM AND METHOD FOR AGGREGATING A MEASURE OVER A NON-ADDITIVE ACCOUNT DIMENSION

FIELD OF THE INVENTION

The present invention relates to the field of data analytical data services, and, more specifically, to aggregation of semi-additive measures.

BACKGROUND OF THE INVENTION

Analytical data services are a key part of many data warehouse and business analysis systems. Such an analytical data service may be, for example, MICROSOFT ANALYSIS SERVICES™ from Microsoft Corp. of Redmond, Wash. Analytical data services provide for fast analysis of multidimensional information. For this purpose, analytical data services provide for multidimensional access and navigation of data in an intuitive and natural way, providing a global view of data that can be drilled down into particular data of interest. Speed and response time are important attributes of analytical data services that allow users to browse and analyze data online in an efficient manner. Further, analytical data services typically provide analytical tools to rank, aggregate, and calculate lead and lag indicators for the data under analysis.

In this context, an analytical data services cube may be modeled according to a user's perception of the data. A cube may organize a data type according to dimensions, each dimension modeled according to an attribute of the data type. For example, a cube may organize "Balance" data according to the dimensions "Time" and "Location" (and possibly other dimensions). Dimension members act as indices for identifying a particular cell or range of cells within the cube. The cube may also have a number of measures, which measure a data type according to its attributes. For example, the cube may have a measure "Value", which measures the value of a balance at a specified time in a specified location.

Analytical data services are often used to analytically model data that is stored in a relational data source such as, for example, an Online Transactional Processing (OLTP) database. Data stored in such a relational data source may be organized according to multiple tables. Each such table may organize a data type according to columns corresponding to attributes and measures. For example, the cube discussed above may be modeled according to a "Balance" table with columns corresponding to attributes "Time" and "Location" and measure "Value".

Typically, there are a number of hierarchies associated with each dimension of a cube. Each such hierarchy includes levels of granularity. For example, the time dimension can consist of years subdivided into quarters subdivided into months subdivided into weeks subdivided into days. The years level is the broadest level of granularity, while the days level is the finest level of granularity. A common scenario with respect to analytical data services processing is that there is data present for a finer child level of granularity, but there is no data present for a broader parent level of granularity. For example, there may be data for the individual months of January, February, and March, but there may be no data for the overall first quarter. To calculate the data for a parent member, it is necessary to aggregate the data for the child members.

The aggregation of child members is performed according to an aggregation function. The most common aggregation function is a simple sum function ("SUM"), in which the entries for each of the child members are summed to calculate the value of the parent members. For example, if the value of balances in January is 3, 9, and 6 for the cities of San Francisco, Los Angeles, and San Diego, respectively, then the SUM value of balances in California for January is 18 (18=3+9+6). Other common aggregation functions include, for example, a minimum function ("MIN"), which provides a minimum value and a maximum function ("MAX"), which provides a maximum value.

In conventional analytical data services, aggregation is performed uniformly, meaning that every dimension in a cube is aggregated according to the same aggregation function. However, a common problem with respect to aggregation is that uniform aggregation is not always desirable. In fact, non-uniform aggregation is particularly desirable in business domains such as, for example, securities, account balances, budgets, and insurance policies and claims. Thus, it may be desirable for a cube to include a number of measures which are semi-additive, meaning that they are aggregated differently across different dimensions. Specifically, semi-additive measures are uniformly aggregated across additive dimensions and non-uniformly aggregated across non-additive dimensions.

A common non-additive dimension is the time dimension, because it is often useful to evaluate measures differently according to time than according to other attributes. For example, with respect to the balance data discussed above, the "Value" measure is cumulative with respect to location but is not cumulative with respect to time. Balance is not cumulative with respect to time because balance measures instantaneous rather than cumulative value. For example, a balance for a first quarter is derived from the balance at the end of March rather than from the sum of the balances for January, February, and March. Accordingly, for balance data, a parent time dimension member is equivalent to the value of its last child member.

Conventional analytical data services enable users to calculate non-additive dimensions of a cube through user defined aggregation. User defined aggregation enables the user to define logic using a proprietary language or a standard language such as multidimensional expressions language (MDX). Such logic expresses how a parent member is computed based in its child members. User defined aggregation is discussed in detail in A. Netz, "OLAP Services: Semiadditive Measures and Inventory Snapshots", Apr. 1, 1999, which is hereby incorporated by reference in its entirety. A drawback of user-defined aggregation is that it requires a proficiency in a proprietary or standard language to define logic for aggregating a non-additive dimension. Another drawback is that logic must be defined separately for each non-additive dimension, which may be particularly tedious and time consuming for a cube that includes a number of non-additive dimensions. Thus, there is a need in the art for a simple interface that enables the user to select non-additive dimensions and to pair each such non-additive dimension with a pre-defined aggregation function.

Another common problem with respect to aggregation is that it is often desirable to aggregate different sets of data differently across a single non-additive dimension. For example, in addition to including data from the "Balances" table, the cube set forth above may also include data from an "Income" table. Unlike balance data, which is not cumulative with respect to time, income data is cumulative with respect to time. Thus, income data and balance data are aggregated differently across the time dimension. As conventional analytical data services are limited in this respect, there is a need in the art for systems and methods which enable different sets of data to be aggregated differently across a single non-additive dimension.

SUMMARY OF THE INVENTION

An interface may be provided that enables a user to define parameters for aggregation of a semi-additive measure of a cube. The interface may enable the user to designate the measure as a semi-additive measure and to pair the measure with an additive aggregation function with which to aggregate the measure over additive dimensions of the cube. The interface may also enable the user to select non-additive dimensions of the cube and to pair each selected non-additive dimension with an associated non-additive aggregation function with which to aggregate the measure over the corresponding non-additive dimension.

According to an aspect of the invention, an aggregation function may be, for example, a sum aggregation function, a maximum aggregation function, a minimum aggregation function, a count aggregation function, a null aggregation function, an average of children aggregation function, a first child aggregation function, a last child aggregation function, a first non-empty child aggregation function, a last non-empty child aggregation function, and a by account aggregation function.

According to another aspect of the invention, if the by account aggregation type is selected, then the interface may enable the user to associate each account in an account dimension with a corresponding account type. Each such account type may, in turn, have an associated aggregation function. Each account may then be aggregated across a corresponding dimension according to its associated account type. Such account types may include, for example, an income account type, an expense account type, a flow account type, a balance account type, an asset account type, a liability account type, a statistical account type, and a missing account type.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 3 shows an exemplary relational table for income data;

FIG. 4 shows an exemplary relational table for balance data;

FIG. 6 shows an exemplary two dimensional slice of a non-aggregated analytical data services cube in accordance with the present invention;

FIG. 9 shows an exemplary interface for selecting non-additive dimensions in accordance with the present invention;

FIG. 11 shows an exemplary two dimensional slice of an analytical data services cube aggregated over a "Location" dimension in accordance with the present invention; and FIG. 12 shows an exemplary two dimensional slice of an analytical data services cube aggregated over a "Time" dimension in accordance with the present invention.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

We will now explain the present invention with reference to presently preferred, exemplary embodiments. We will first describe illustrative computing and development environments in which the invention may be practiced, and then we will describe presently preferred implementations of the invention.

Illustrative Computer Environment

Figure 1:
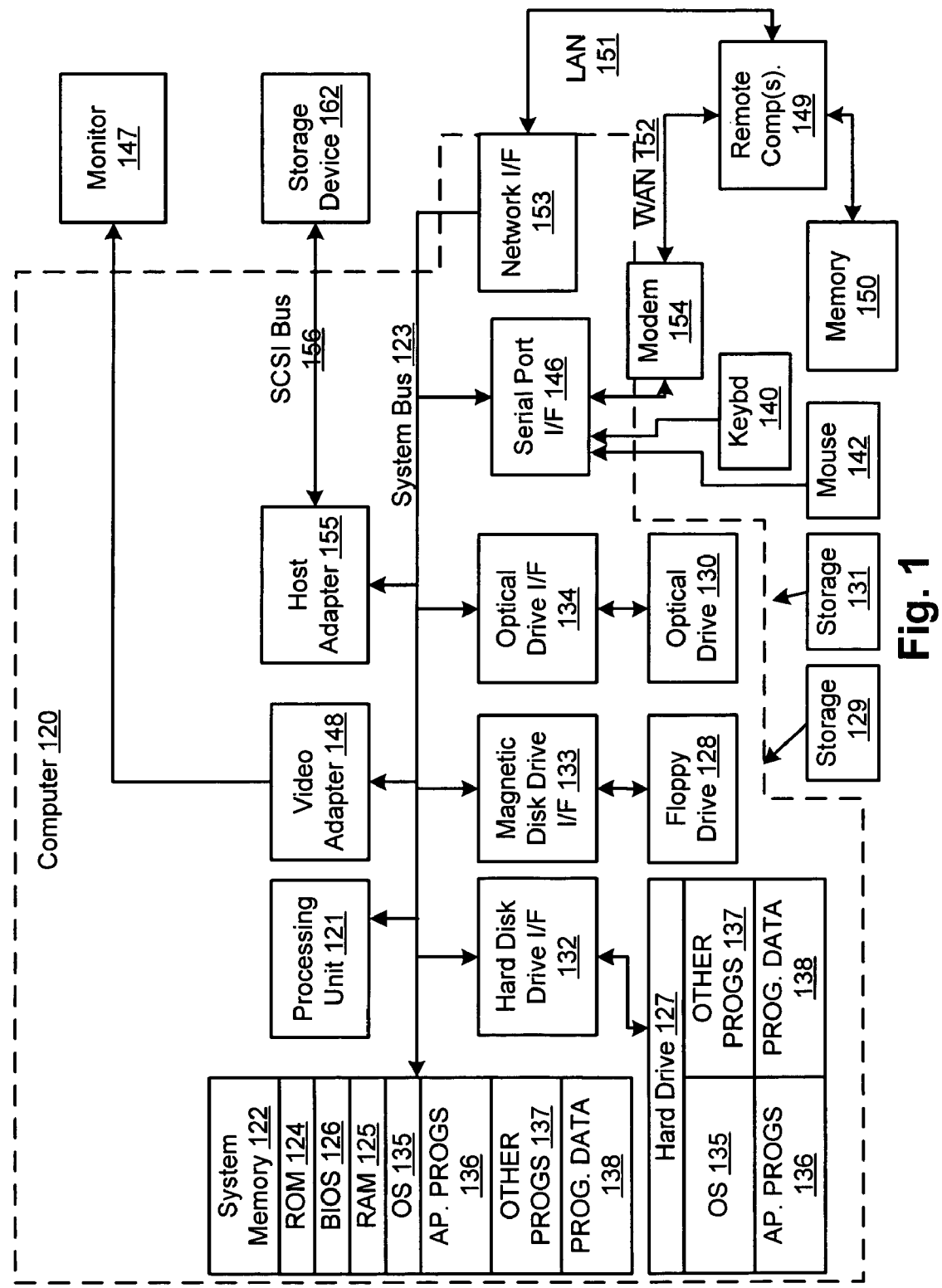
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or an application service. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a application service, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Systems and Methods for Semi-Additive Aggregation

Figure 2:
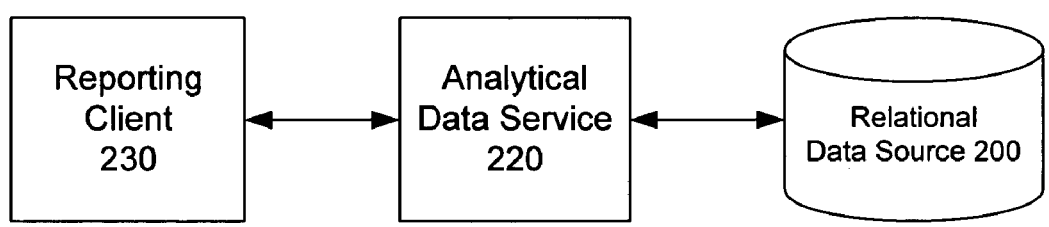
FIG. 2 is a block diagram of an exemplary system for analytically modeling data in accordance with the present invention.

An exemplary system for analytically modeling data in accordance with the present invention is shown in FIG. 2. As shown, an analytical data service 220 may be employed to model data stored in a relational data source 200 such as, for example, an On-Line Transactional Database (OLTD). Analytical data service 220 may present analytically modeled data via reporting client 230. As set forth previously, data stored in relational data source 200 may be organized according to multiple tables, with each table including data corresponding to a particular data type.

A table corresponding to a particular data type may be organized according to columns corresponding to data attributes and measures. Two exemplary tables are shown in FIGS. 3 and 4. Referring now to FIG. 3, "Income" table 300 stores income data for Account A. "Income" table 300 is organized according to columns 302a-d (and possibly other columns) corresponding to attributes "account" 302a, "Time" 302b, and "Location" 302c and measure "Value" 302d. "Time" column 302b is at the month level of granularity, and "Location" column 302c is at the city level of granularity. Referring now to FIG. 4, "Balance" table 400 stores balance data for Account B. "Balance" table 400 is organized according to columns 402a-d (and possibly other columns) corresponding to attributes "account" 402a, "Time" 402b, and "Location" 402c and measure "Value" 402d. "Time" column 402b is at the month level of granularity, and "Location" column 402c is at the city level of granularity.

Figure 5:
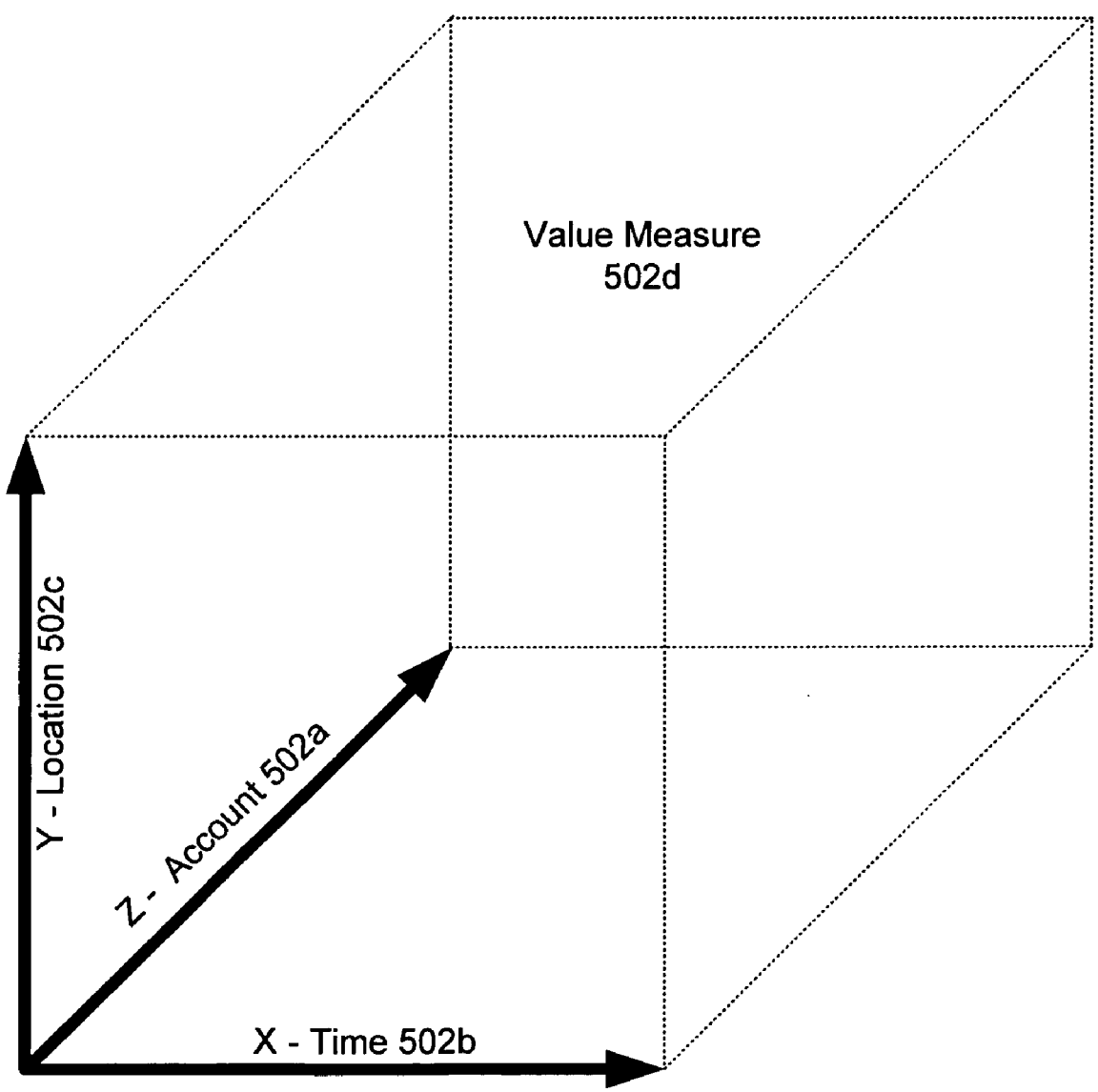
FIG. 5 shows an exemplary analytical data services cube in accordance with the present invention.

Analytical data service 220 may model data tables 300 and 400 according to an analytical data service cube. Referring now to FIG. 5, exemplary analytical data service cube 500 includes dimensions 502a-c (and possibly other dimensions). Z axis dimension 502a corresponds to the "Account" attribute, X axis dimension 502b corresponds to the "Time" attribute, and Y axis dimension 502c corresponds to the "Location" attribute. Cube 500 also includes measure 502d corresponding to the "Value" measure.

A two dimensional cross section 600 of cube 500 is shown in FIG. 6. Cross section 600 is a grid that includes "Time" dimension 502b and "Location" dimension 502c. "Time" dimension 502b includes finer month granularity level 504b and broader quarter granularity level 506b. "Location" dimension 502c includes finer city granularity level 504c and broader state granularity level 506b. Cross section 600 includes nine cells that show "Value" measure 502d at month granularity level 504b and city granularity level 504c. Each such cell includes two numbers separated by a slash. The first such number is the value for Account A for the corresponding month and city. The second such number is the value for Account B for the corresponding month and city. As should be appreciated, the number in each of the nine cells of cross section 600 is derived from the corresponding number in "Value" columns 302d and 402d of "Incomes" table 300 and "Balances" table 400, respectively.

While cross section 600 shows values for the finer month 504b and city 504c levels of granularity, it is often desirable to evaluate data at broader levels of granularity. For example, rather than evaluating the income in San Francisco only for January, it may be desirable to evaluate the value of income in San Francisco for the first quarter of the year. Occasionally, data at such broader levels of granularity may be included in underlying data tables. When such broader data is available, it may be modeled in an analytical data services cube without performing additional calculations at analytical data service 220. However, as in the case of "Income" table 300 and "Balance" table 400, data at such broader levels of granularity is often unavailable. When such broader data is unavailable, analytical data service 220 may calculate the broader data by aggregating data at the finer granularity levels up to the broader granularity levels.

As set forth previously, in conventional analytical data services, data for a measure is aggregated uniformly across every dimension in a cube. However, it is often desirable to aggregate data differently across different dimensions. For example, because balance data is not cumulative with respect to time, it is desirable to evaluate balance data differently with respect to the time dimension than with respect to the location dimension. Thus, the "Value" measure 502*d* of cube 500 may be referred to as a semi-additive measure, meaning that it is aggregated differently across different dimensions.

Figure 7:
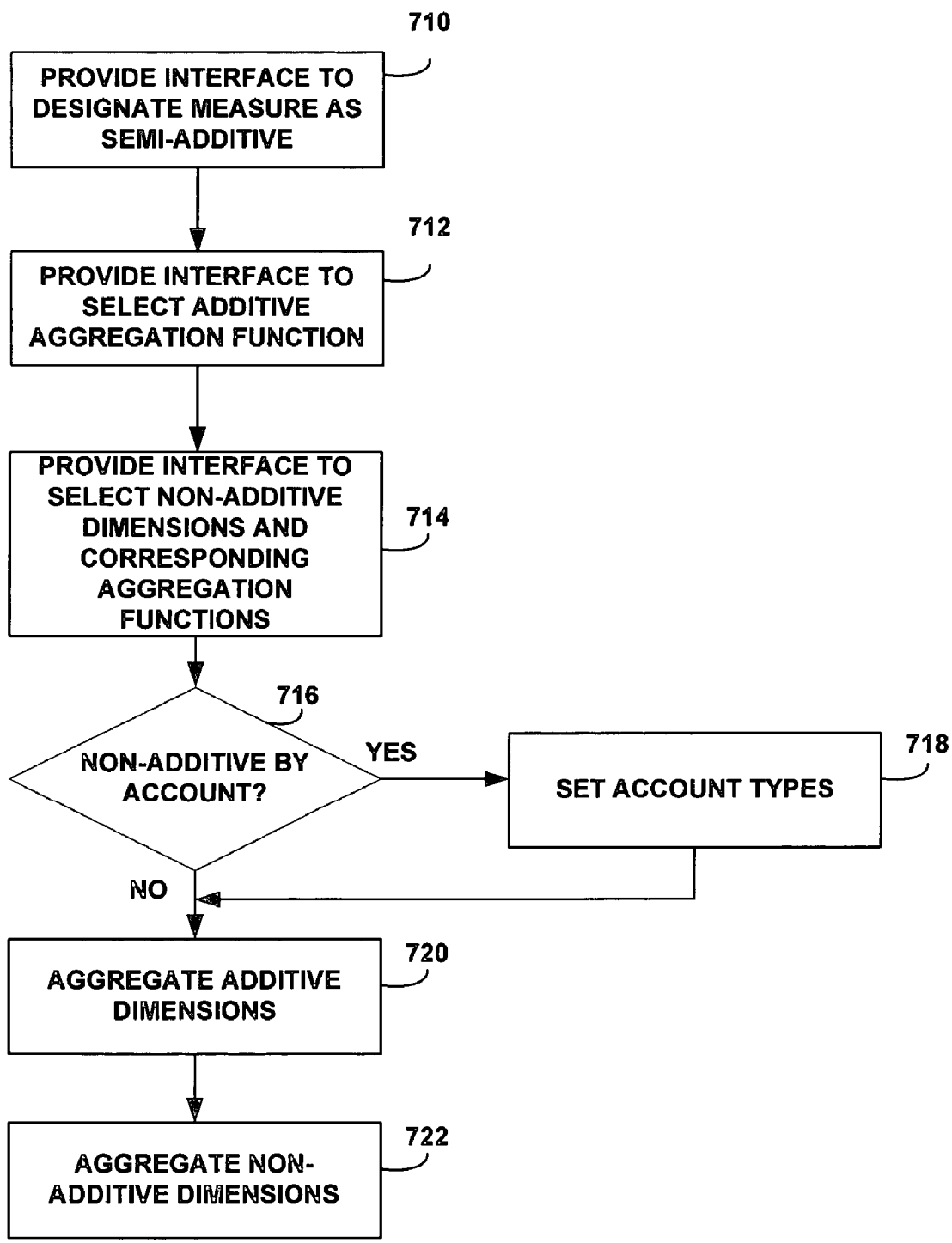
FIG. 7 shows a flowchart of an exemplary method for semi-additive aggregation in accordance with the present invention

A flowchart of an exemplary method for semi-additive aggregation in accordance with the present invention is shown in FIG. 7. The steps shown in FIG. 7 are described below with respect to a number of exemplary interfaces. As should be appreciated, such exemplary interfaces are merely intended for illustrative purposes. The steps recited below may be performed using a single or any number of multiple different interfaces with various different types of input fields and/or menus.

Figure 8:
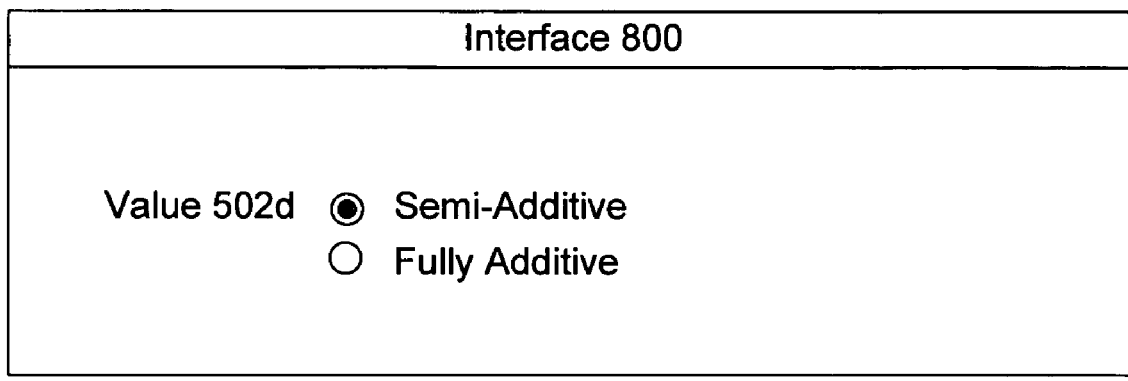
FIG. 8 shows an exemplary interface for designating a measure as semi-additive in accordance with the present invention.

At step 710, analytical data service 220 provides an interface that enables the user to designate a measure as a semi-additive measure. Referring now to FIG. 8, exemplary interface 800 includes a set of radio buttons which enable the user to designate "Value" measure 502*d* as a semi-additive measure of cube 500. The measures included within interface 800 may be automatically determined by analytical data service 220 based on underlying data.

At step 712, analytical data service 220 provides an interface that enables the user to select an additive aggregation function for the designated semi-additive measure. Referring now to FIG. 9, exemplary interface 900 includes a user input field 905 which enables the user to select an additive aggregation function for "Value" measure 502*d*. As shown, the sum aggregation function is selected.

At step 714, analytical data service 220 provides an interface that enables the user to select non-additive dimensions and to pair each selected non-additive dimension with a corresponding aggregation function. Interface 900 includes drop down menus 910*a* and 910*b* corresponding to "Time" dimension 502*b* and "Location" dimension 502*c*, respectively. The dimensions included within interface 900 may be automatically determined based on corresponding underlying data. As should be appreciated, although exemplary interface 900 shows only two dimensions, a cube in accordance with the present invention may include any number of dimensions.

The default item in drop down menus 910*a* and 910*b* may be the "additive" item. Accordingly, if the user does not engage a drop down menu 910*a* or 910*b*, then its corresponding dimension is designated as an additive dimension. As shown, drop down menu 910*b* is set to "additive", resulting in "Location" dimension 502*c* being an additive dimension. The user may designate a dimension as a non-additive dimension by engaging a drop down menu 910*a* or 910*b* and selecting one of the included non-additive aggregation functions. As shown, drop down menu 910*a* is engaged and "Time" dimension 502*b* is selected as a non-additive dimension with an associated by account aggregation function that will be discussed in detail below.

Drop down menus 910*a* and 910*b* include a number of exemplary aggregation functions. The average of children aggregation function evaluates a parent member as the average of its child members. For example, if the entries for a measure are 2, 4, and 6 for the months of January, February, and March, respectively, then the average of children aggregation function will evaluate the entry for the first quarter as 4 (4=12/3). The average of children aggregation function preferably does not count an empty value as zero. The first child aggregation function evaluates a parent member as the equivalent of its first child member. For example, for the entries 2, 4, and 6, the first child aggregation function will evaluate the entry for the first quarter as 2. The last child aggregation function evaluates a parent member as the equivalent of its last child member. For example, for the entries 2, 4, and 6, the last child aggregation function will evaluate the entry for the first quarter as 6.

The first non-empty child aggregation function evaluates a parent member as the equivalent of its first non-empty child member. For example, if no data is available for the January entry and the entries for February and March are 4 and 6, respectively, then the first non-empty child aggregation function will evaluate the entry for the first quarter as 4. The last non-empty child aggregation function evaluates a parent member as the equivalent of its last non-empty child member. For example, if no data is available for the March entry and the entries for January and February are 2 and 4, respectively, then the last non-empty child aggregation function will evaluate the entry for the first quarter as 4. The null aggregation function may be selected when data is available for the parent member and, accordingly, the child members need not be aggregated.

The "by account" aggregation function enables different accounts to be aggregated differently across a single dimension. As should be appreciated, the term account, as used herein, refers to any dimension with members that are aggregated differently across another dimension. For example, in place of "Account" dimension 502*a*, a cube may include a "Product" dimension with two members: apples and oranges. If apples are aggregated differently than oranges across another dimension of the cube, then the "Product" dimension may be considered an account dimension as the term is used herein. Furthermore, apples and oranges may each be considered accounts as the term is used herein. As shown, drop down menu 910*a* is set to "by account", resulting in "Time" dimension 502*b* being a non-additive dimension with a corresponding by account aggregation function.

Figure 10:
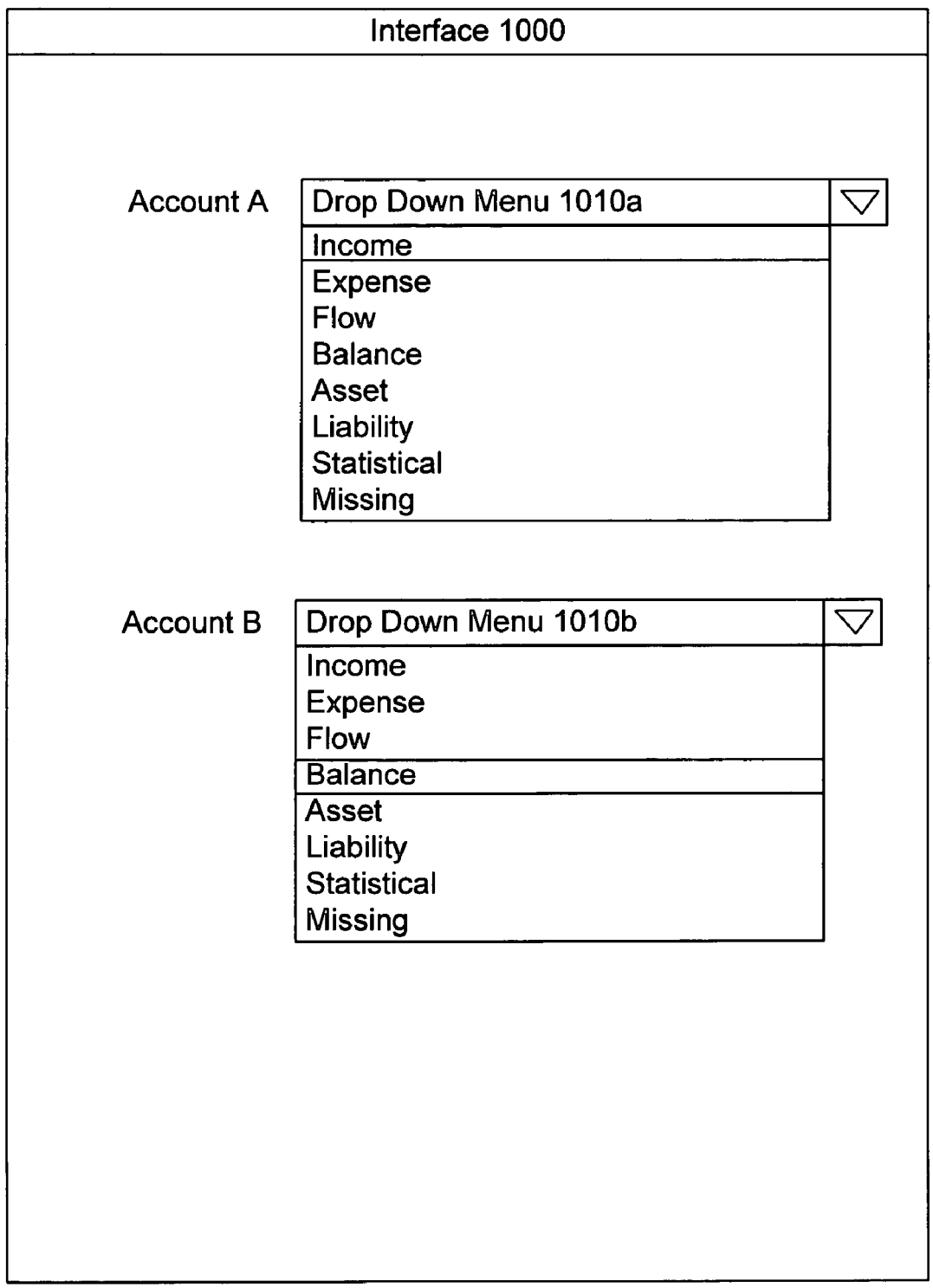
FIG. 10 shows an exemplary interface for selecting account types in accordance with the present invention.

At step 716, it is determined whether any of the non-additive dimensions are non-additive by account. If so, then, at step 718, an interface is provided that enables the user to set up account types for each account. Referring now to FIG. 10, exemplary interface 1000 includes drop-down menus 1010*a* and 1010*b* that enable the user to select account types for Account A and Account B, respectively. Analytical data service 220 may automatically determine the accounts in interface 1000 based on corresponding underlying data. As should be appreciated, although exemplary interface 1000 shows only two accounts, a cube in accordance with the present invention may include any number of accounts.

Drop down menus 1010*a* and 1010*b* include a number of exemplary account types, each with a corresponding aggregation function. The income account type represents an input value and has a corresponding sum aggregation function. The expense account type represents an output value and has a corresponding sum aggregation function. The flow account type represents an incremental count and has a corresponding sum aggregation function. The balance account type represents a instantaneous count and has a corresponding last non-empty child aggregation function. The asset account type represents a instantaneous value and has a corresponding last non-empty child aggregation function. The liability account type represents an owed value and has a corresponding last non-empty child aggregation function. The statistical account type represents a calculated ratio of a measure and does not aggregate over a corresponding non-additive dimension. The statistical account type has a corresponding null aggregation function. The missing account type simply corresponds to a sum aggregation function. Importantly, the corresponding aggregation functions for each account type are merely default selections and may be changed. As shown, Account A is selected as an income account, while account B is selected as a balance account.

At step 720, data is aggregated across additive dimensions. Referring now to FIG. 11, cross section 1100 shows "Value" measure 502d aggregated across "Location" dimension 502c. Unlike cross section 600 of FIG. 6 which shows "Value" measure 502d at the finer city granularity level 504c, cross section 1100 shows "Value" measure 502d at the broader state granularity level 506c. For both Account A and Account B, analytical data service 220 aggregates across "Location" dimension 502c by setting the value of each of the three parent state columns to the sum of its three child city cells. As should be appreciated, value is summed across "Location" dimension 502c because it is an additive dimension. The sum aggregation function is the selected additive aggregation function, as set forth above with reference to step 712.

At step 722, data is aggregated across non-additive dimensions. Data may be aggregated across non-additive dimensions using, for example, multidimensional expressions language (MDX) expressions. Such MDX expressions may be automatically generated by analytical data service 220 in response to the aggregation functions and account types selected at steps 714 and 718.

Referring now to FIG. 12, cross section 1200 shows "Value" measure 502d aggregated across "Time" dimension 502c. Unlike cross section 600 of FIG. 6 which shows "Value" measure 502d at the finer month granularity level 504b, cross section 1200 shows "Value" measure 502d at the broader quarter granularity level 506c.

For Account A (the number to the left of the slash), analytical data service 220 aggregates across "Time" dimension 502b by setting the value of each of the three parent quarter rows to the sum of each of its three child month cells. As should be appreciated, for Account A, value is summed across "Time" dimension 502b because it is a by account dimension, and Account A is designated as an income account, as set forth above with reference to step 718.

For Account B (the number to the right of the slash), analytical data service 220 aggregates across "Time" dimension 502b by setting the value of each of the three parent quarter rows to the value of its last child month cell. As should be appreciated, for Account B, value is set to the last child across "Time" dimension 502b because it is a by account dimension, and Account B is designated as a balance account, as set forth above with reference to step 718.

CONCLUSION

Systems and methods for semi-additive aggregation have been disclosed. A simple interface may be provided that enables the user to define parameters for aggregation of a semi-additive measure. The interface may enable the user to designate a measure as a semi-additive measure and to pair the measure with an additive aggregation function. The interface may also enable the user to select non-additive dimensions and to pair each non-additive dimension with a corresponding aggregation function. One such aggregation function is a by account aggregation function, which enables each account in an account dimension to be aggregated across a corresponding non-additive dimension according to an associated account type.

While the present invention has been described in connection with the preferred embodiments of the various figures, it is to be understood that other similar embodiments may be used or modifications and additions may be made to the described embodiment for performing the same function of the present invention without deviating therefrom. For example, additional aggregation functions and account types are contemplated in accordance with the present invention. Therefore, the present invention should not be limited to any single embodiment, but rather should be construed in breadth and scope in accordance with the appended claims.

What is claimed:

1. A computer-readable storage medium having computer-executable instructions that, when executed by a computing device, cause the computing device to aggregate a semi-additive measure over an additive dimension of a cube and over a non-additive dimension of the cube by:
   aggregating the semi-additive measure for a plurality of members of the additive dimension using an additive aggregation function;
   providing a first interface comprising a plurality of first user-selectable elements, each first user-selectable element associated with a respective account type that is an income account type, an expense account type, a flow account type, a balance account type, an asset account type, a liability account type, a statistical account type or a missing account type;
   receiving a user selection of at least two of the first user-selectable elements;
   defining, based on the selected first user-selectable elements, a first account associated with a first data table and comprising a plurality of first members of the non-additive dimension and a second account associated with a second data table and comprising a plurality of second members of the non-additive dimension, the non-additive dimension having a parent member that includes at least one child member selected from the first members and the second members;
   providing a second interface comprising a plurality of second user-selectable elements, each second user-selectable element associated with a respective non-additive aggregation function that is different from the additive aggregation function;
   for each of the first and second accounts, receiving a user selection of one of the second user-selectable elements;
   associating the first account with the non-additive aggregation function that is associated with the second user-selectable element that was selected for the first account;
   associating the second account with the non-additive aggregation function that is associated with the second user-selectable element that was selected for the second account;
   evaluating the parent member by aggregating the semi-additive measure for the first members according to the non-additive aggregation function associated with the first account and by aggregating the semi-additive measure for the second members according to the non-additive aggregation function associated with the second account; and
   outputting the evaluated parent member.

2. The computer-readable storage medium of claim 1, wherein the non-additive aggregation function associated with the first account is a null aggregation function.

3. The computer-readable storage medium of claim 1, wherein the non-additive aggregation function associated with the first account is an average of children aggregation function.

4. The computer-readable storage medium of claim 1, wherein the non-additive aggregation function associated with the first account is a first child aggregation function.

5. The computer-readable storage medium of claim 1, wherein the non-additive aggregation function associated with the first account is a last child aggregation function.

6. The computer-readable storage medium of claim 1, wherein the non-additive aggregation function associated with the first account is a first non-empty child aggregation function.

7. The computer-readable storage medium of claim 1, wherein the non-additive aggregation function associated with the first account is a last non-empty child aggregation function.

8. A method for aggregating a semi-additive measure over an additive dimension of a cube and over a non-additive dimension of the cube comprising:
   aggregating by at least one computer processor the semi-additive measure for a plurality of members of the additive dimension using an additive aggregation function;
   providing a first interface comprising a plurality of first user-selectable elements, each first user-selectable element associated with a respective account type that is an income account type, an expense account type, a flow account type, a balance account type, an asset account type, a liability account type, a statistical account type or a missing account type;
   receiving a user selection of at least two of the first user-selectable elements;
   defining, based on the selected first user-selectable elements, a first account associated with a first data table and comprising a plurality of first members of the non-additive dimension and a second account associated with a second data table and comprising a plurality of second members of the non-additive dimension, the non-additive dimension having a parent member that includes at least one child member selected from the first members and the second members;
   providing a second interface comprising a plurality of second user-selectable elements, each second user-selectable element associated with a respective non-additive aggregation function that is different from the additive aggregation function;
   for each of the first and second accounts, receiving a user selection of one of the second user-selectable elements;
   associating the first account with the non-additive aggregation function that is associated with the second user-selectable element that was selected for the first account;
   associating the second account with the non-additive aggregation function that is associated with the second user-selectable element that was selected for the second account;
   evaluating by the at least one computer processor the parent member by aggregating the semi-additive measure for the first members according to the non-additive aggregation function associated with the first account and by aggregating the semi-additive measure for the second members according to the non-additive aggregation function associated with the second account; and
   outputting the evaluated parent member.

9. The method of claim 8, wherein the non-additive aggregation function associated with the first account is a null aggregation function.

10. The method of claim 8, wherein the non-additive aggregation function associated with the first account is an average of children aggregation function.

11. The method of claim 8, wherein the non-additive aggregation function associated with the first account is a first child aggregation function.

12. The method of claim 8, wherein the non-additive aggregation function associated with the first account is a last child aggregation function.

13. The method of claim 8, wherein the non-additive aggregation function associated with the first account is a first non-empty child aggregation function.

14. The method of claim 8, wherein the non-additive aggregation function associated with the first account is a last non-empty child aggregation function.

15. A system for aggregating a semi-additive measure over an additive dimension of a cube and over a non-additive dimension of the cube comprising:
   a processor for executing computer-executable instructions;
   a memory having stored therein the computer-executable instructions comprising:
      aggregating the semi-additive measure for a plurality of members of the additive dimension using an additive aggregation function;
      providing a first interface comprising a plurality of first user-selectable elements, each first user-selectable element associated with a respective account type that is an income account type, an expense account type, a flow account type, a balance account type, an asset account type, a liability account type, a statistical account type or a missing account type;
      receiving a user selection of at least two of the first user-selectable elements;
      defining, based on the selected first user-selectable elements, a first account associated with a first data table and comprising a plurality of first members of the non-additive dimension and a second account associated with a second data table and comprising a plurality of second members of the non-additive dimension, the non-additive dimension having a parent member that includes at least one child member selected from the first members and the second members;
      providing a second interface comprising a plurality of second user-selectable elements, each second user-selectable element associated with a respective non-additive aggregation function that is different from the additive aggregation function;
      for each of the first and second accounts, receiving a user selection of one of the second user-selectable elements;
      associating the first account with the non-additive aggregation function that is associated with the second user-selectable element that was selected for the first account;
      associating the second account with the non-additive aggregation function that is associated with the second user-selectable element that was selected for the second account;
      evaluating the parent member by aggregating the semi-additive measure for the first members according to the non-additive aggregation function associated with the first account and by aggregating the semi-additive measure for the second members according to the non-additive aggregation function associated with the second account; and outputting the evaluated parent member.

16. The system of claim 15, wherein the non-additive aggregation function associated with the first account is a null aggregation function.

17. The system of claim 15, wherein the non-additive aggregation function associated with the first account is an average of children aggregation function.

18. The system of claim 15, wherein the non-additive aggregation function associated with the first account is a first child aggregation function.

19. The system of claim 15, wherein the non-additive aggregation function associated with the first account is a last child aggregation function.

20. The system of claim 15, wherein the non-additive aggregation function associated with the first account is a first non-empty child aggregation function.

21. The system of claim 15, wherein the non-additive aggregation function associated with the first account is a last non-empty child aggregation function.

* * * * *